United States Patent [19]
Addison

[11] 3,716,068
[45] Feb. 13, 1973

[54] SURFACE CONTROLLED BLOWOUT ARRESTER

[76] Inventor: Frank F. Addison, Drawer 3743, Lafayette, La. 70501

[22] Filed: June 11, 1971

[21] Appl. No.: 152,111

[52] U.S. Cl. .................137/67, 72/325, 72/464, 137/318, 166/55, 251/1
[51] Int. Cl. .............................................E21b 29/00
[58] Field of Search ...137/67, 68, 318; 166/55, 55.1, 166/298; 72/324, 325, 464; 83/660; 30/92

[56] References Cited

UNITED STATES PATENTS

| | | |
|---|---|---|
| 1,648,107 | 11/1927 | Brogdon et al.................166/55.1 X |
| 1,851,894 | 3/1932 | Clough....................................166/55 |
| 3,532,113 | 10/1970 | McKean................................137/318 |
| 3,561,526 | 2/1971 | Williams et al.....................137/68 X |
| 3,590,920 | 7/1971 | Drund et al. .........................166/55 |
| 3,125,108 | 3/1964 | Murphy..................................137/68 |

*Primary Examiner*—Martin P. Schwadron
*Assistant Examiner*—Richard Gerard
*Attorney*—Pravel, Wilson & Matthews

[57] ABSTRACT

A valve apparatus is provided for cutting into and deforming a flow line such that flow therethrough is arrested.

5 Claims, 2 Drawing Figures

PATENTED FEB 13 1973

3,716,068

INVENTOR
Frank F. Addison
BY
Pravel Wilson & Matthews
ATTORNEYS 3,716,068

SURFACE CONTROLLED BLOWOUT ARRESTER

BACKGROUND OF THE INVENTION

This invention relates to a valve apparatus for controlling flow through a flow line; and in one aspect, this invention relates to an apparatus for arresting an oil well blow out and a fire resulting therefrom.

Generally, valves used under emergency conditions to arrest flow through a flow line, such as when a flow line is leaking or there has been a valve failure, are mounted in the flow line. Such in-line emergency action valves arrest flow by moving a valve element into a closed position within the flow line. These in-line emergency valves, although generally effective, are continually exposed to the corrosive and other damaging characteristics of the fluid in the flow line.

In oil and gas production, offshore christmas trees at the surface of the water are susceptible to damage not only from the natural elements such as by wave action but also from collisions with ships. Should the christmas tree or the production line itself be seriously damaged, a "blowout" of oil and gas from the well occurs. The uncontrolled deluge of oil resulting from an offshore well blowout results in tragic damage to the ecological balance of nature. Any fires at the christmas trees caused by the blowout are also a cause of great concern, for the christmas tree cannot be repaired until the fire has been extinguished.

Presently, many types of blowout preventers are available. One type of blowout preventer comprises two rams mounted in a housing about the production line. When a blowout occurs, these rams are driven into each other with such force that the production line is crushed thereby blocking the well. Such blowout preventers may be hydraulically actuated; but, the pressures required to close the rams are significantly high.

SUMMARY OF THE INVENTION

It is an object of the present invention to provide a new and improved valve apparatus that is adapted to control flow through a flow line from a position about the flow line.

This and other objects of this invention are provided by a valve apparatus for controlling the flow of fluid through a flow line. The valve apparatus includes a housing adapted to be mounted about the flow line and a flow blocking means mounted in the housing for movement toward the flow line. Means are provided for moving the flow blocking means into engagement with the flow line so that the flow blocking means will cut into the flow line and block the flow of fluid therethrough.

BRIEF DESCRIPTION OF THE DRAWINGS

The preferred embodiment of this invention will be described hereinafter, together with other features thereof which will become evident from the description.

The invention will be more readily understood from a reading of the following specification and by reference to the accompanying drawings forming a part thereof wherein one or more embodiments of the invention are shown and wherein.

DESCRIPTION OF THE PREFERRED EMBODIMENT

Figure 1:
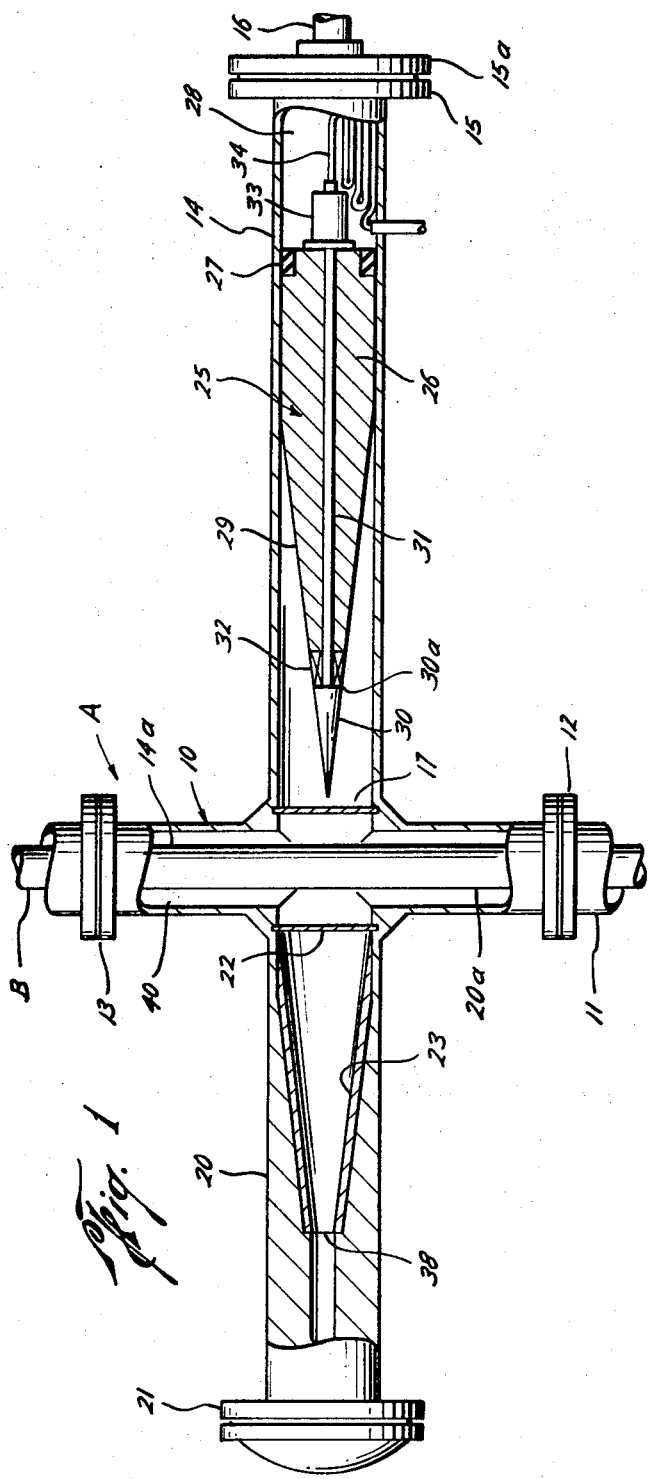
FIG. 1 is an elevational view of the blowout arrester of the invention prior to actuation with a substantial portion of the housing removed.
Figure 2:
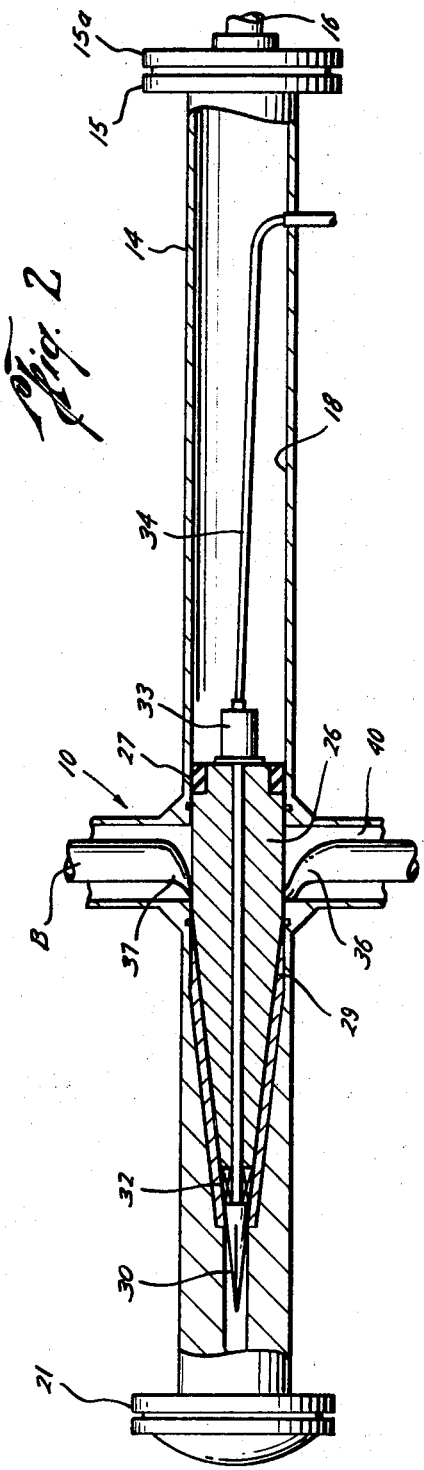
FIG. 2 is an elevational view of the blowout arrester partially in section with flow through the flow line blocked.

As illustrated in FIGS. 1 and 2, a blowout arrester A is mounted about a production line B in a position to, upon actuation, block flow through the production line. The blowout arrester may be secured in this position by the connecting of the housing 10 of the blow out arrester to the casing 11, which is disposed concentrically outwardly of the production line B, by any suitable means such as the flanged connections 12 and 13. As will be discussed later, the blow out arrester A will control the flow of oil through production line B in the cut of a blowout; further, the blowout arrester of this invention will cause any fires that are being fueled by oil coming from the production line B to be extinguished by cutting out the uncontrolled flow of oil through the production line. Housing 10 includes a first section 14 disposed on side 14a of flow line B. First housing section 14 is substantially cylindrical in shape with its longitudinal axis extending transverse to the longitudinal axis of the production line B. The first housing section is sealed at one end by any suitable means such as a flange 15 and a plate 15a connection. A hydraulic line 16 extends through an opening (not shown) in the plate 15a and is sealingly mounted in the plate so that the inside of the first housing section 14 may receive hydraulic fluid under pressure from a point remote from the apparatus. A soft plug 17 is mounted in inside wall 18 of second housing section 14 in order to prevent the oil and gas flowing through production line B from depositing debris or other matter in the first housing section prior to actuation of the blow out arrester.

Second housing section 20 is disposed on side 20a of production line B and is also generally cylindrical in shape with its longitudinal axis being substantially transverse to the longitudinal axis of the production line. Further, the longitudinal axis of the second housing section is in alignment with the longitudinal axis of the first housing section 14. Second housing section 20 is sealed by a flange connection 21 at one end and a soft plug 22 protects the inner wall 23 of the second housing section against the collection of debris or other matter in the second housing section prior to actuation of the blowout arrester.

A flow blocking means 25 is slidably mounted within first housing section 14 for movement toward and engagement with production line B. Flow blocking means 25 includes a section 26 that is cylindrical in shape with a diameter substantially equal to the diameter of inner wall 18 of the second housing section so that the flow blocking means may be moved within the second housing section. An annular sealing ring 27 is mounted about cylindrical portion 26 of the flow blocking means and engages inner wall 18 of the second housing section in order to provide a seal against the passage of fluid therebetween. The sealably, slidably mounted flow blocking means 25 cooperates with housing section 14 to form an expandable chamber 28 whereby, as fluid (which may be hydraulic fluid or a gas) under pressure enters through line 16 into expandable chamber 28, the flow blocking means is moved along inner housing wall 18 toward the production line. In this manner, means are provided for moving the flow blocking means into engagement with the production line. The moving means may be actuated by the pumping of fluid under pressure through line 16 from a point remote from the blowout arrester itself.

The flow blocking means further includes a section 29 that is conical in shape and integral with the cylindrically shaped section 27. A cutting head 30 is mounted for rotation with shaft 31, which is mounted for rotation in sections 27 and 29 of the flow blocking means by bearings 32. A hydraulic motor 33 is mounted onto cylindrical section 27 and is drivingly connected to shaft 31 in order to cause rotation of cutter head 30. The hydraulic motor 33 rotates cutting head 30 by the application of hydraulic fluid under pressure through an expandable hose 34 so that the hydraulic motor can rotate the cutting head even as the entire flow arresting means is moved toward the production line. Even though motor 33 is herein described as a hydraulic motor, a motor may be provided that is driven by another fluid such as air.

When a blowout occurs, hydraulic fluid is applied under pressure through hydraulic line 16 into expandable chamber 28 and through hydraulic line 34 into hydraulic motor 33. The actuation by hydraulic fluid under pressure causes cutter head 30 to rotate and the flow blocking means 25 to be simultaneously moved toward this production line. As the flow blocking means moves toward the production line, cutter head 30 tears through soft plug 17 and then engages production line side 14a. As cutter head 30 engages the production line, it cuts into the line and, since the cutter head is conical in shape, the cutter head reams a larger and larger hole in side 14a as the flow blocking means is moved further into engagement with the line. As the flow blocking means is moved even further into engagement with the production line, cutter head 30 cuts into the second wall portion 20a and penetrates therethrough.

Conical section 29 enters the line through the hole cut by cutter head 30 and, acting as a wedge, eventually shears the line into two portions as the conical section is driven further and further into engagement with the flow line. Finally, when the flow blocking means has reached the position shown in FIG. 2 the production line has been sheared by the wedging action of conical section 29 into two portions and deformed such that the flow of oil or gas through the deformed portions 36 and 37 of the production line is blocked. One of the significant advantages of the combination of the cutter head and the wedging action of conical section 29 of the flow blocking means is that the production line may be penetrated and sheared into two portions and thereafter deformed such that flow is prevented without having to use extremely high actuating hydraulic pressures. This is due to the drilling action of the cutting head in cutting holes in the production line thereby weakening the line such that the force necessary to shear the line into two portions and deform it is substantially less than if simply a ram were used to deform the flow line by a shearing force alone.

The relative diameters or widths of the cutting head 30, the conical section 29 and the cylindrical portion 26 may vary. For instance, the cutting head may have a diameter at its base 30a equal to the inside diameter of the production line B so that the production line is completely cut through. If the cutting head is of a larger size, the production line will be deformed less by the wedging action of conical section 29 and cylindrical portion 26 may actually engage the cut edges of the production line and block flow directly rather than by deforming the production line. Whatever the relative size of the various portions of the flow blocking means, the effect of inserting it into the production line is the same, the arresting of flow through the flow line.

Inner wall 23 of second housing section 20 is also conical in shape and has a hole 38 through the apex of the cone formed by the inner wall in order to receive and secure the flow blocking means against movement past the position shown in FIG. 2. Hole 38 in the second housing section allows cutter head 30 to extend therethrough thereby preventing damage to the cutter head or to the housing section. After the christmas trees and the production line have been prepared flow blocking means 25 can be returned to the position shown in FIG. 1 and prepared for emergency use again.

In the preferred embodiment described and in the drawing, the flow arrester A is mounted in casing 11. Thus there is an annular space 40 between the production line B and the inside wall 14 of the housing. It is within the scope of this invention to adapt the housing 10 for mounting directly onto production line B rather than in the casing 11. By adapting the housing to be mounted directly into the flow line B the apparatus could be easily mounted on existing production lines without altering the casing 11. In adapting the housing to be mounted directly on the production line, the soft plugs 17 and 22 could be eliminated since there would be no flow between the apparatus housing and the production line.

The foregoing disclosure and description of the invention are illustrative and explanatory thereof, and various changes in the size, shape and materials as well as in the details of the illustrated construction may be made without departing from the spirit of the invention. For example, the blowout preventer described may be used as a valve for controlling flow through various types of flow lines, one of the advantages of such a valve being that the valve elements are not exposed to the fluid in the flow line to be controlled until actuated.

I CLAIM:

1. An apparatus for controlling the flow of fluid through a flow line comprising:
   a. a housing adapted to be mounted about said flow line;
   b. a flow blocking means mounted in said housing for movement toward said flow line;
   c. moving means for moving said flow blocking means into engagement with said flow line; and
   d. said flow blocking means including a cutting head with means for rotating same for cutting into the flow line as the said moving means moves said cutting head into engagement with said flow line and a conical section having a generally conical shape whereby, as said moving means causes said conical section to engage said flow line, said flow line is sheared into two portions such that said flow line is deformed to prevent flow therethrough.

2. The apparatus set forth in claim 1 including:
a. said rotating means is a hydraulic motor which may be actuated from a point remote from said apparatus.

3. The apparatus set forth in claim 1 including:
a. said housing having a first section with a sealed end disposed on one side of said flow line;
b. said blocking means being slidably mounted in said first section between said sealed end and said flow line; and
c. sealing means mounted on said blocking means for sealing against the passage of fluid between said blocking means and said first housing section such that an expandable chamber is formed in said housing whereby fluid entering said expandable chamber under pressure causes said blocking means to be moved into engagement with said flow line.

4. The apparatus set forth in claim 1 including:
a. said housing having a first section disposed on one side of said flow line and a second section disposed on the other side of said flow line in substantial alignment with said first housing section;
b. said blocking means being mounted in said first housing section for movement toward both said flow line and said second housing section;
c. said moving means for moving said blocking means into engagement with said flow line also moving said blocking means into said second housing section on the other side of said flow line; and
d. said second section including a receiving means for receiving and securing said blocking means against further movement after flow through said flow line has been blocked.

5. The apparatus set forth in claim 4, including:
said second housing section having an inner surface substantially conical in shape such that said inner surface secures said conical section of said blocking means against further movement.

* * * * *